(No Model.)
F. K. IRVING & F. M. HILL.
ELECTROLYTE FOR GALVANIC BATTERIES.
No. 436,001. Patented Sept. 9, 1890.
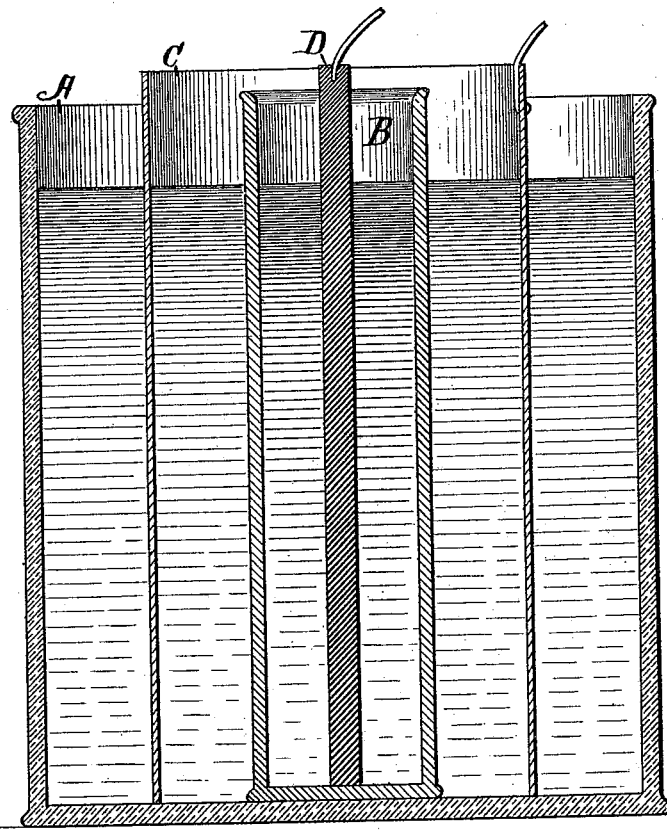
Attest.
Victor J. Evans.
J. McNamee.
Frank K. Irving
Fred. M. Hill
Inventors.
By H. J. Ennis,
Atty.

UNITED STATES PATENT OFFICE.

FRANK K. IRVING AND FREDERICK M. HILL, OF BROOKLYN, ASSIGNORS OF ONE-THIRD TO THEODORE W. BAYAUD, OF NEW YORK, N. Y.

ELECTROLYTE FOR GALVANIC BATTERIES.

SPECIFICATION forming part of Letters Patent No. 436,001, dated September 9, 1890.

Application filed January 3, 1890. Serial No. 335,808. (No specimens.)

*To all whom it may concern:*

Be it known that we, FRANK K. IRVING and FREDERICK M. HILL, citizens of the United States, residing in Brooklyn, in the county of Kings and State of New York, have invented certain new and useful Improvements in an Electrolyte or Liquid for an Excitant and Depolarizer for Galvanic Batteries, whereby the electro-motive force and constancy of each cell or element are increased; and we do hereby declare that the following is a full, clear, and exact description of our newly-invented chemical combination and mixture of acids and salts for an electrolyte or exciting and depolarizing liquid for primary or galvanic batteries, which will enable others skilled in the art to which it appertains to make and use the same.

The figure in the drawing represents an ordinary form of cell, in which—

A is the outside cup or jar; B, the porous cup; C, the zinc element, and D the carbon element, our electrolyte being shown in the porous cup and the usual excitant in the zinc-pole compartment.

We take sulphuric acid, chromic acid, and nitrate of peroxide of iron and mix them together with water. The resulting solution, mixture, and combination produces an electrolyte or exciting-liquid for a primary or galvanic battery of superior qualities, giving an increased voltage and without eliminating any hyponitric-acid gas, thereby producing with zinc or other similar metal, together with carbon or platinum or other similar metal, an odorless galvanic element.

Heretofore in galvanic batteries, when sulphuric acid, chromic acid, and nitric acids have been used, and when the element was in electric and chemical action, hyponitric-acid gas was set free by deoxidation of the nitric acid, which made the solution very objectionable; but in our solution the nitric acid which is set free from the nitrate of the protoxide or pernitrate of iron during electrolytic action acting as a depolarizer, (by loosening oxygen, which combines with the hydrogen set free from the decomposition of the water,) also the hyponitric-acid gas set free in the nascent state, are instantly oxidized by the oxygen from the decomposition of the chromic acid to nitric acid again, and at once combines with the protoxide or peroxide of iron set free in the hydrated nascent state to form nitrate of the protoxide or peroxide again, decomposing and recomposing until the sulphuric and chromic acids are used up by the electrolytic and chemical action with the oxide of zinc and hydrogen by the decomposition of the water. These decompositions and recompositions above alluded to give the increased voltage to the solution far in excess of the voltage of the ordinary sulphuric, chromic, and nitric acids and water mixtures, and the combination of the nitric acid with protoxide or peroxide of iron is much more easily handled, is not caustic, and has no fumes. We can use nitrate of a protosalt other than the protosalts of the alkali or alkaline metals; but the protosalts absorb the oxygen from the chromic acid and the solution will not last long as a depolarizer. We sometimes produce the nitrate of protoxide or peroxide of iron in the mixture by adding to the sulphuric and chromic acids and water sulphate of the protoxide or peroxide of iron and nitrate of soda or potash or other alkali or alkaline nitrate, when chemical change takes place—as, for instance, the nitrate of soda becomes sulphate of soda and the sulphate of iron becomes nitrate of protoxide or peroxide of iron, the sulphate of soda remaining in solution. This way of adding the nitrate of iron to the solution may be cheaper than to use the nitrate of the peroxide of iron, as nitrate of soda and sulphate of protoxide of iron are very cheap articles of commerce.

We can use any proportions of the combinations alluded to; but we prefer a mixture, as giving the best results, consisting of one gallon of water, five pounds of sulphuric acid, three pounds of chromic acid, and ten ounces of the protonitrate or pernitrate of iron of a supersaturated solution. Our solution does not crystallize, as the nitrate of iron absorbs water from the air and remains liquid.

We claim—

In an electrolyte or liquid for an excitant and depolarizer in a galvanic battery, a chemical combination, mixture, and solution consisting of sulphuric acid, chromic acid, and nitrate of the protoxide or peroxide of iron, as and for the purpose specified.

FRANK K. IRVING.
FREDERICK M. HILL.

Witnesses:
G. T. TENEMOND,
GEO. T. BAYAUD.